United States Patent

Fenton

[15] 3,691,310

[45] Sept. 12, 1972

[54] BUSY AND TALKING LINK ALLOTTER CIRCUIT FOR ELECTRONIC KEY TELEPHONE SYSTEM

[72] Inventor: Francis Michael Fenton, Boulder, Colo.

[73] Assignee: Bell Telephone Laboratories, Incorporated, Murray Hill, Berkeley Heights, N.J.

[22] Filed: Dec. 21, 1970

[21] Appl. No.: 100,311

[52] U.S. Cl. .............179/18 AD, 179/18 AB, 179/99

[51] Int. Cl. ..............................................H04m 3/22

[58] Field of Search................179/18 AD, 18 AB, 99

*Primary Examiner*—William C. Cooper
*Assistant Examiner*—Thomas W. Brown
*Attorney*—R. J. Guenther and James Warren Falk

[57] ABSTRACT

An electronic key telephone system is disclosed in which each station set regardless of the number of pick-up keys with which it may be equipped may be connected to a local switching network via only a single pair of tip and ring conductors and a data link. The local switching network provides for intercom calls among the local key telephone sets through the use of an allotter circuit which detects an intercom service request during a predetermined time slot to accord a first station access to a talking link and to a call signaling register. When the called station is rung and answers the call, it is accorded access to the talking link by making a service request in a manner similar to that of the first calling station. The allotter circuit connects any other service requesting station to a busy link. Provision is made for compensating for variations in the operating times of the circuits in the allotter with respect to the assigned time slot during which operation is desired to take place. Simplification is achieved in that NOR gate flip-flops are used to connect stations to the busy link and the operation of one of these flip-flops may be canceled when desired by the simultaneous application of set and reset input signals.

12 Claims, 6 Drawing Figures

INVENTOR
F. M. FENTON
BY Howard R Popper
ATTORNEY

BUSY AND TALKING LINK ALLOTTER CIRCUIT FOR ELECTRONIC KEY TELEPHONE SYSTEM

BACKGROUND OF THE INVENTION

This invention relates to communication systems and more particularly to small private branch exchange or key systems in which it is desired to provide for intercom calls among groups of stations.

Recently the telephone industry has seen a resurgence of effort directed to improving key telephone station systems. This effort has involved the modernization of station sets equipments and the reduction in the amount and complexity of initial cabling required as well as the amount of alteration required to be performed as customers move. Renewed attention has also been given to the provision of additional services for key system users. Because there is normally a high community of interest within each customer group of key telephone set users, the desirability of offering intercom or conferencing service in such groups has been apparent for some time. However, since each such key telephone system must have its cost amortized over the equipments allocated for use by a single customer, the market has heretofore been limited primarily to only those telephone customers able to afford the expense necessitated by the complexities of circuit design required to afford such extra services.

In my copending application entitled "Key Telephone System Link Switching Network" Ser. No. 60,505 filed Aug. 3, 1970, I have disclosed an intercom link arrangement capable of being fabricated with the aid of printed circuit technology thereby rendering the manufacture of such equipment sufficiently economical to be attractive to a large segment of the key telephone system market. This copending application solves the problem of eliminating battery feed coils from the intercom link. As the intercom system was disclosed therein, a conventional allotter circuit was employed for assigning key telephone stations to the talking or busy links. However, in accordance with the present invention, I have made an additional simplification in the allotter circuit thereby further reducing the cost of the equipment needed for furnishing intercom service.

The nature of my present improvement may be understood by first briefly reviewing the function of the allotter circuit. In an intercom system, it is necessary to detect which station in the group first makes the request for intercom service so that this station may be given exclusive access to a register for the purpose of sending ungarbled call signaling information to identify the called station. When the called station is identified and ringing is applied, the customer at the called station will answer the call. Naturally, the greatest simplification in set design would be obtained if both the request for access to the register incident to the initiation of the call by the first station as well as the request for access to the talking link incident to the answering of the call by the second station could be produced by exactly the same circuit equipment at each of the telephone sets. However, this simplification of the station set equipments necessitates that the allotter circuit be able to distinguish between a subsequent request for access to the register and a request for access to the talking link made by a called telephone. In keeping with the objective to provide intercom service to the widest possible market of key telephone set users, it will be extremely desirable to provide this discriminating function in the allotter at the lowest cost consistent with service reliability.

Accordingly, it is an object of the present invention to provide a link allotter for an intercom system capable of assigning telephone stations to the link without interference.

It is another object of the present invention to permit both calling and called telephone stations to obtain access to an intercom link by exhibiting the same signal to the link allotter.

SUMMARY OF THE INVENTION

The foregoing and other objects of my invention are achieved in one illustrative embodiment in which I provide an allotter circuit capable of responding to an intercom-service request from a first off-hook station to connect that station to the register and the talking link and to exclude any subsequent intercom-service-requesting station except the particular station being called by the first station. In the illustrative embodiment, I provide a talking link and a busy link and my allotter circuit connects other service-requesting stations to the busy link while the register is in use on a prior call. In the allotter I provide a first and second NOR gate flip-flop for each station, the first flip-flop being settable to connect the station to the talking link and the second flip-flop being settable to connect the station to the busy link. At the same time that the first intercom-service-requesting station is connected to the talking link, the allotter circuit gives the station exclusive access to a register-decoder to identify a called one of the stations. The allotter circuit then provides one path from the output of the register-decoder to turn on the called station's control transistor in the talking link and another path to inhibit the called station's busy link flip-flop. Accordingly when the called party requests access to the talking link incident to answering the call, the called station's busy link flip-flop will not be set. The busy link flip-flop of any other intercom-service-requesting station will be set causing that station to be connected to the busy link.

According to a further aspect of my invention, I provide for setting the aforementioned NOR gate flip-flop that connects the first calling station to the talking link during a predetermined time slot interval. The setting of this talking link flip-flop is detected and causes a signal to be applied to a common bus. The signal on the common bus together with a subsequent service request from another station normally serves to set that other station's busy link flip-flop. In order to provide for economical installation, it is desired to use components which may exhibit some tolerance in operating times with respect to the time interval of the aforementioned time slot. Accordingly, should the operating time of the calling station's talking link flip-flop overlap the persistance of the aforementioned time slot and consequently cause the first calling station's service request falsely to appear as a service request from a subsequent station, I provide an additional circuit to prevent the calling station's busy link flip-flop from being erroneously set. In order to simplify the circuit, I allow the signal for setting the calling station's busy link flip-flop to be generated. However, I provide a circuit which tends to reset a calling station's busy link flip-flop once its talking link flip-flop has been set. According to this aspect of my invention, the use of cross-coupled NOR gates as the busy link flip-flop permits set and reset signals simultaneously to exist at the busy link flip-flop inputs without causing them erroneously to be set.

DESCRIPTION OF THE DRAWING

The foregoing and other objects and features of the invention may be more clearly understood from a reading of the following description of the illustrative embodiment together with the drawing in which.

GENERAL DESCRIPTION OF FIG. 1

Figure 1:
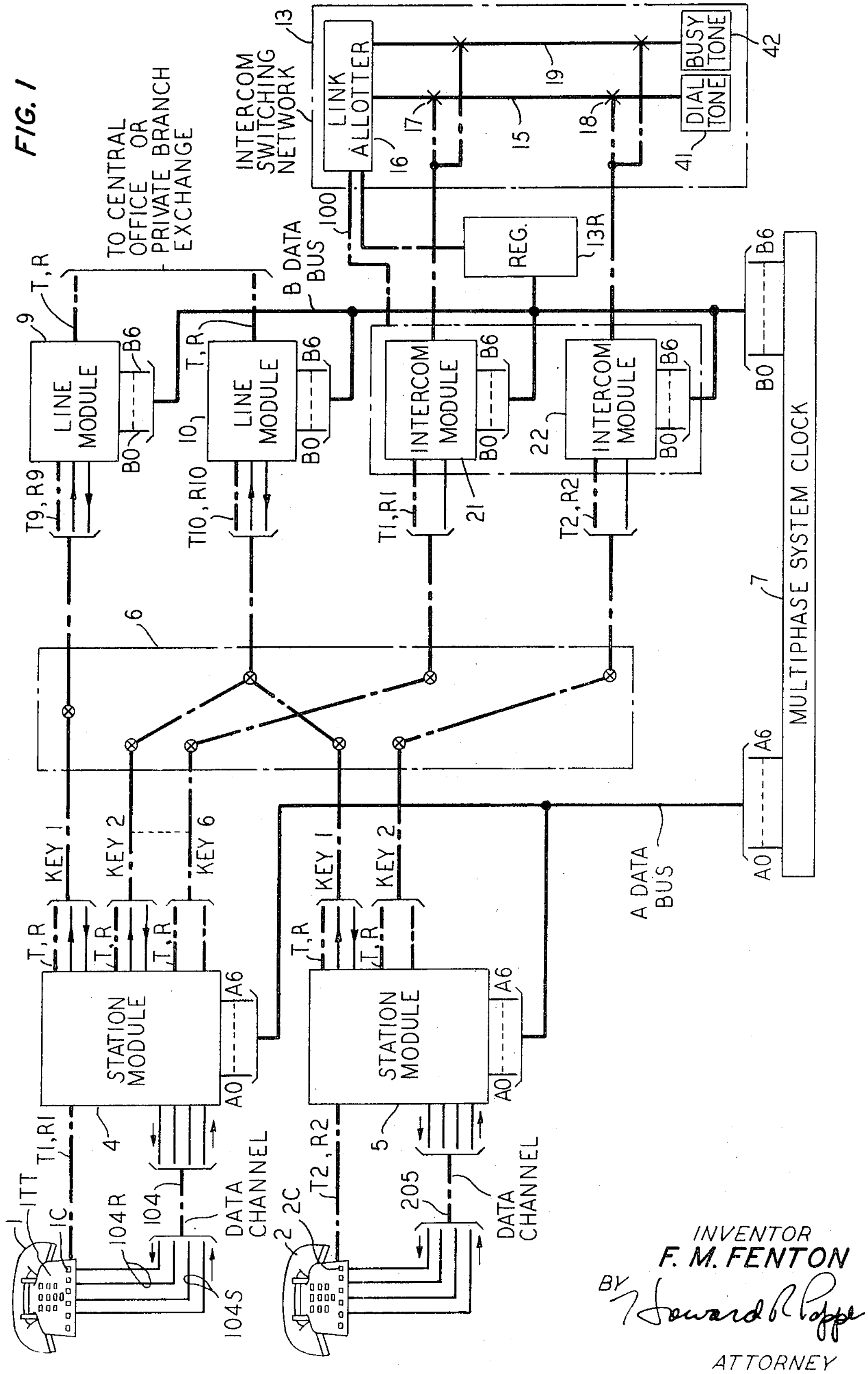
FIG. 1 shows a block diagram of an electronically controlled key telephone system in which my intercom link allotter circuit may find application.

FIG. 1 shows an illustrative electronically controlled key telephone system in which the intercom conferencing link allotter of the present invention may be employed. An example of such a key telephone system may be found in the copending application of D. J. H. Knollman and J. L. Simon, Ser. No. 43,812, filed June 5, 1970, entitled "A Modular Key Telephone System Having a Distributed Processor Organization." Another system in which the apparatus of the present invention may be employed is the key telephone system disclosed in D. J. H. Knollman, Ser. No. 726,062 filed May 2, 1968, now Pat. No. 3,549,820, entitled "Key Telephone Station Concentrator."

In the illustrative key telephone system, each of the plurality of key telephone station sets 1, 2 is associated with a respective station module 4, 5.

Between each of the station sets 1, 2 and its associated station module 4, 5 are the tip and ring leads T1, R1, T2, R2 and a respective four-conductor cable 104, 205 for two-way data transmission. The status of any station set key button may be transmitted from a station set to its associated station module over one pair of leads in the data cable and information from the station module concerning the illumination of key buttons corresponding to off-hook, ringing or held lines that can be picked up by operating such buttons is transmitted over the other pair of data leads.

As described in the above-mentioned Knollman-Simon application, information for controlling the station modules may be transmitted from a multiphase system clock 7 over a multiple conductor "A data" bus. Also as described therein, the station modules can be cross-connected through cross-connection field 6 with any of a plurality of line modules or service modules for according each key button position on a telephone set access to a respective telephone line or key telephone system service. Thus, for example, the terminals of station module 4 that are associated with keys 1 and 2 of set 1 are shown cross-connected in network 6 to line modules 9 and 10, respectively, in order to provide station set 1 with pick-up access to two different central office lines. Conversely, line module 10 is also cross-connected with station module 5 so that its associated central office line can also be picked up by key 1 of station set 2. The line modules, as described in the above-mentioned Knollman-Simon application receive control signals from multiphase system clock 7 over the seven conductor cable of the "B data" bus.

Figure 2:
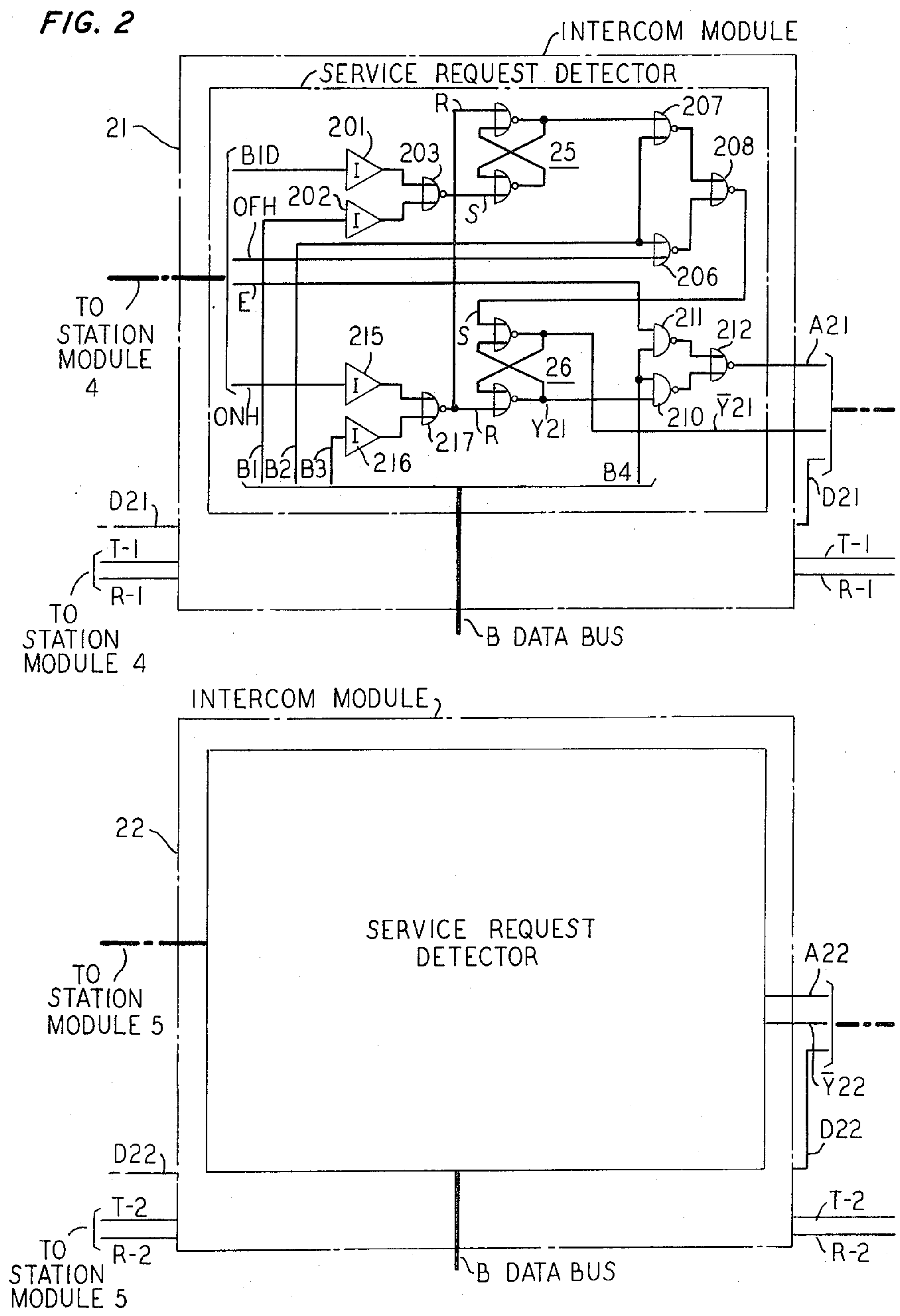
FIG. 2 shows the plurality of service-request detector circuits of the intercom modules of the key telephone system of FIG. 1.
Figure 6:
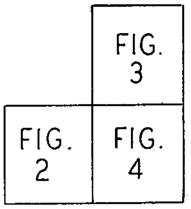
FIG. 6 is a key diagram showing the arrangement of FIGS. 2, 3, and 4.
Figure 4:
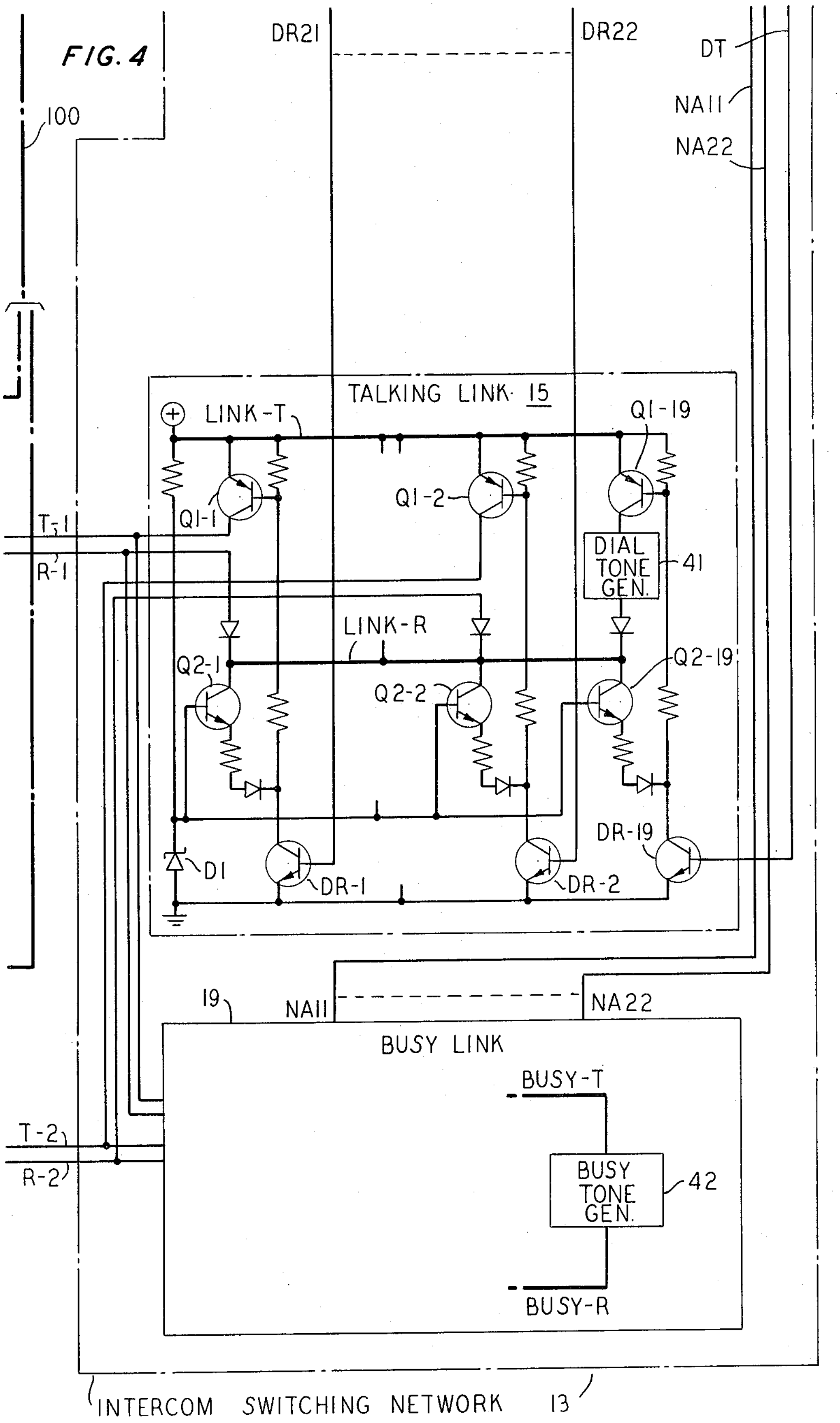
FIG. 4 shows the intercom switching network.

Intercom service may also be one of the services made available to the key telephone stations of the foregoing Knollman-Simon system by providing a plurality of intercom modules 21, 22 that can be cross-connected through cross-connection field 6 to a station module terminal corresponding to an intercom key on any of the station sets in the key system. Sufficient of the detailed circuitry of the intercom modules necessary to the understanding of the present invention is shown in FIG. 2 and will be described in detail hereinafter. Briefly, however, when an intercom key at one of stations 1 or 2 is depressed, the respective one of the intercom modules 21 or 22, under control of the signals appearing on the B data bus, accesses intercom switching network 13. Network 13, as described in my copending application Ser. No. 60,505 filed Aug. 3, 1970, comprises a conferencing link 15, the details of which are shown in FIG. 4.

When the key system customer at a key telephone set, such as key telephone set 1, desires to initiate an intercom call, he removes the handset from the switchhook cradle and depresses the sixth key button 1C for intercom service. This generates a signal that is received by station module 4. Station module 4 in turn supplies a signal indicating a bid for intercom service to the intercom module 21 to which it is connected in cross-connect field 6. Responsive thereto intercom module 21 generates a request over cable 100 to link allotter 16 of intercom switching network 13. In accordance with one aspect of my invention, it is not necessary for intercom module 21 to determine whether station set 1 is initiating an intercom call or responding to one; it transmits the same request over a respective lead in cable 100 to allotter 16 in both cases.

If no other telephone set has previously initiated a request for intercom service, link allotter 16 controls crosspoint 17 to establish a path for the tip and ring conductors from station set 1 to talking link 15. At the same time allotter 16 provides a path for register 13R to turn on dial-tone generator 41 and accords station 1 exclusive access to enter call signaling information into the register. Thereafter the customer at key telephone set 1 may transmit the call signaling information by operating push buttons 1TT to designate the number of the desired conferee station.

As described in the copending application of H. P. Anderson and F. M. Fenton Ser. No. 100,202 filed on even date herewith, the call signaling push buttons 1TT of the station set may advantageously be adapted to encode and transmit their operations in digital form. The call signaling information may thus be transmitted in the form of a six-bit binary code over the send pair 104S of data conductors in cable 104 through the station module 4, cross-connection field 6, intercom module 11 and respective leads of cable 100 to register 13R. There the binary bit pattern designating the called conferee station will be decoded. The call signaling and link allotter 16 will operate the crosspoint 18 to connect the called conferee station to link 15.

DETAILED DESCRIPTION

Intercom Module

Referring now to FIG. 2, details of the service-request detector are shown for intercom module 21, previously referred to in FIG. 1, together with a block representation of intercom module 22. When the station user places set 1, FIG. 1 in the off-hook state and depresses the sixth pick-up key button 1C for access to intercom switching network 13, coded representations of the state of the switchhook and intercom button are transmitted over data send leads 104S to station module 4 during respective time slots determined by activated ones of the leads of the A data bus supplying the station modules and the B data bus supplying the intercom modules. During subsequent time slot intervals, the information registered in the service-request detector is verified by the appearance of a no-error signal and thereafter the service-request detector provides a high signal on output lead A21 to allotter 16 of FIG. 3 via a respective lead in cable 100. Allotter 16 responsive to the service request controls the talking link 15 or the busy link 19 of FIG. 4 to connect leads T–1 and R–1 to the dial-tone source 41 or the busy-tone source 42 depending upon whether station 1 requests access to the talking link at a time when the link has not already been seized for use by another service-requesting station.

The particular details of the illustrative intercom module of FIG. 2 will now be described. An alternate form of intercom module is shown in the above-mentioned copending application of Anderson-Fenton, that intercom module being designed to cooperate with a station module that assumes some of the functions shown as being performed within the intercom module of FIG. 2. Let it be assumed that station module 4 of FIG. 1 has detected the operated state of key 1C of station set 1. During time slot B1 (FIG. 5), station module 4 forwards this information to intercom module 21 by applying a signal on lead BID. While lead BID is shown as a separate conductor in the cable between station module 4 and intercom module 21 it and conductor OFH,E and ONH may be replaced by a single lead in the cable inasmuch as the time slot signals B1, B2, B3 and B4 define the information to be transmitted by the station module to the intercom module. For purposes of simplification, the circuitry in the intercom module that would be employed for controlling visual signals at the station set has been omitted as not being essential to an understanding of the present invention. The occurrence of time slot B1 is indicated by the presence of a high signal on time slot lead B1 of the B data bus. The high signals on leads BID and C1 are applied to inverters 201 and 202, respectively, at the imputs of NOR gate 203. NOR gate 203, accordingly, receives low signals on both its inputs, and at its output applies a high signal to the set input of flip-flop 25. As is well known, a NOR gate produces a high signal at its output when, and only when, both of its inputs have low signals applied. During the second time slot interval defined by a high signal on lead B2, station module 4 will apply a high signal to lead OFH to indicate that station set 1 is in the off-hook condition. High signals on leads OFH and B2 cause high signals to be applied to both inputs of NOR gate 206 which in turn applies a low signal to the lower input of NOR gate 208. The upper input of NOR gate 208 is supplied with a low signal by the output of NOR gate 207, the low appearing because both inputs of NOR gate 207 receive high signals. The upper input of NOR gate 207 receives a high signal from flip-flop 25 while the lower input receives the high signal appearing on lead B2. With both inputs of NOR gate 208 in the low signal condition, the output of NOR gate 208 applies a high signal to the set input of flip-flop 26. Flip-flop 26 in the set state applies a high signal on the lead Y21 and a low signal on lead $\overline{Y21}$.

The high signal appearing lead Y21 is supplied also to the lower input of NAND gate 210. A NAND gate, as is well known, is a device which produces a low signal at its output when, and only when, both of its inputs receive high signals. During time slot pulse B4, intercom module 21 should receive a no-error bit on lead E from station module 4. This high signal appearing on lead E is applied to the upper input of NAND gate 211. The other input of each of NAND gates 210 and 211 is connected to lead B4 and receives a high signal during time slot B4. Accordingly, the outputs of these gates apply low signals to each of the inputs of NOR gate 212. Responsive thereto NOR gate 212 applies a high signal to lead A21. The high signal on lead A21 is delivered to link allotter 16 shown in detail in FIG. 3, and represents a request for access to talking link 15, shown in detail in FIG. 4.

Figure 5:
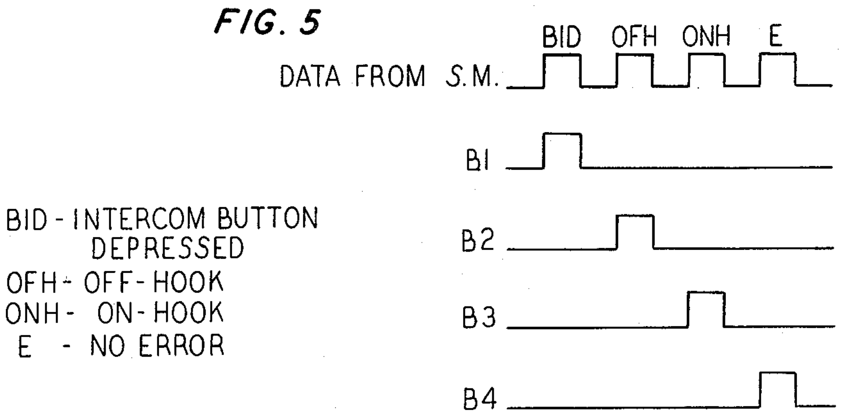
FIG. 5 shows a timing diagram for the service-request detector of FIG. 2.

If station set 1 had replaced the handset on the switchhook cradle after initiating the bid for access to the intercom link, the on-hook state of the switchhook would be detected in the station set and a signal indicative thereof sent to station module 4. Responsive thereto station module 4 would apply a high signal to lead ONH. The high signal on lead ONH would be applied to inverter 215 which in turn would apply a low signal to the upper input of NOR gate 217. During time slot pulse B3, (which precedes time slot pulse B4, as shown in FIG. 5) a high signal will be applied on lead B3 to inverter 216 which, in turn, will apply a low signal to the lower input of NOR gate 217. Accordingly, if station set 1 were on-hook, NOR gate 217 would apply a high signal to the reset inputs of each of flip-flops 25 and 26. Flip-flop 26 in the reset state maintains a high signal on lead $\overline{Y21}$ and a low signal on lead Y21. The reset state of flip-flop 26 also prevents a high signal from appearing on request-for-talking-link-access lead A21 during time slot B4.

Figure 3:
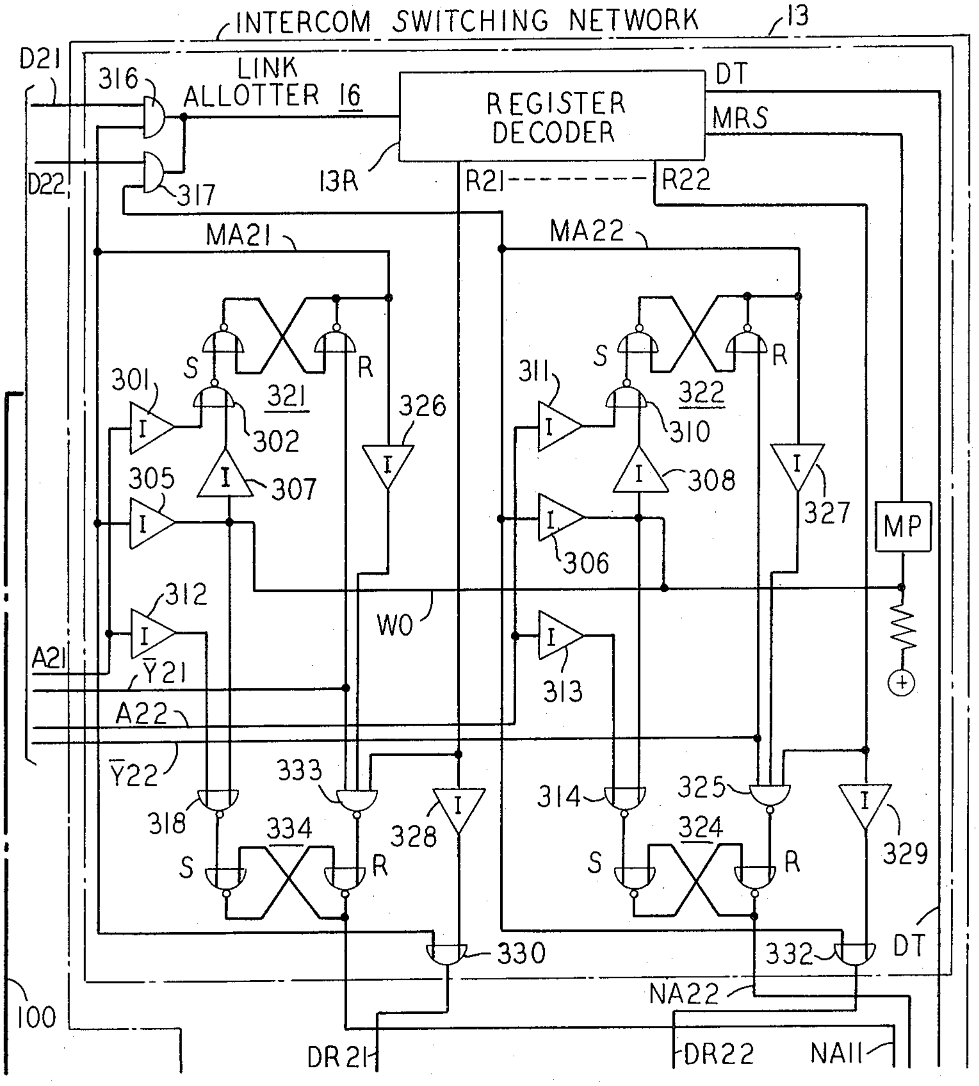
FIG. 3 shows the register-decoder and allotter circuits.

Allotter Circuit (FIGS. 3 and 4)

Continuing with the original assumption that set 1 is still requesting access to the talking link and referring now to FIG. 3, the high signal on lead A21 during time slot B4 is applied to inverter 301. The low signal which then appears at the output of inverter 301 is applied to the left-hand input of NOR gate 302. Assuming that no other station set has requested access to the talking link since the request by station 1, a low signal will be present at the right-hand input of NOR gate 302 which is connected to bus WO via inverter 307, as will hereinafter be more fully explained. Since both of its inputs have low signals applied, NOR gate 302 provides a high signal to the set input of talking link flip-flop 321. Flip-flops 321, 322, 334 and 324 are each NOR gate flip-flops. The reason for employing NOR gate flip-flops in allotter 16 will be explained hereinafter. Flip-flop 321 is thereby set and applies a high signal to lead MA21. The high signal on lead MA21 is coupled via OR gate 330 and lead DR21 to the base of transistor DR–1 in FIG. 4, to turn on transistor DR–1 thereby connecting lead T–1 to bus LINK-T and lead R–1 to bus LINK-R of talking link 15. At the same time, the high signal at the output of talking link flip-flop 321 maintains AND gate 316 enabled so that call signaling information from station set 1 appearing on lead D21 may be entered into register-decoder 13R.

As described in the above-mentioned copending application of F. M. Fenton, the turning on of transistor DR–1 in talking link 15 causes transistors Q1–1 and Q2–1 to turn on. Transistor Q1–1 connects lead T–1 to bus LINK-T while transistor Q2–1 connects an increment of constant current supply to talking link 15. Transistor Q2–1 is biased for constant current operation by Zener diode D1. Each of the other station sets has a set of transistors in link 15 comparable to transistors Q1–1, Q2–1 and DR–1.

Returning now to the description of FIG. 3, the high signal on lead MA21 is inverted by inverter 305 and appears as a low signal on bus WO. The low signal on bus WO prevents a high signal that might now appear on the A– lead of any other intercom module from setting its corresponding talking link flip-flop in the link allotter. Thus, if intercom module 22 of FIG. 2 should now apply a high signal to lead A22 (because station set 2 had initiated a request for intercom service) the high signal, inverted by inverter 311 would be applied as a low signal to the left-hand input of NOR gate 310. The low signal applied to bus WO by inverter 305 is applied as a high signal to the right-hand input of NOR gate 310 by inverter 308. Since NOR gate 310 has one input low and the other input high, the output of NOR gate 310 will not be high and therefore will be ineffective to set talking link flip-flop 322.

Assuming that station 2 did in fact attempt to initiate an intercom call after station 1, the high signal appearing on lead A22 would, as mentioned above, be ineffective to set talking link flip-flop 322 and station set 2 would not, therefore, be connected to talking link 15. However, the high signal on lead A22 applied through inverter 313 appears as a low signal at the left-hand input of NOR gate 314. The right-hand input of NOR gate 314 is provided with a low signal from bus WO. Accordingly, NOR gate 314 applies a high signal at its output to set busy link flip-flop 324 which, in turn, applies a high signal to lead NA22. Lead NA22 is connected to the base of a DR– transistor (not shown) in busy link circuit 19, FIG. 4, similar to transistor DR–2 of talking link 15. The turning on of this transistor in busy link 19 connects T–2 and R–2 to buses BUSY-T and BUSY-R respectively to connect the tone provided by busy-tone generator 42 to station set 2.

Assuming that register 13R is in the idle state, lead DT is provided with a high signal turning on dial tone connecting transistor DR–19 in talking link 15 of FIG. 4. Turning on transistor DR–19 turns on transistors Q1–19 and Q2–19, the former connecting dial-tone generator 41 to bus LINK-T and the latter providing an additional increment of constant current to the talking link to operate the dial-tone generator. Accordingly, the station user at station set 1 hears audible dial tone provided over tip and ring conductors T–1, 2. The station user may now operate the call signaling push buttons ITT at station set 1 to transmit the identity of 1TT called conferee station to station module 4. The operated call signaling push buttons of station set 1, as described in the above-mentioned copending application of Anderson and Fenton, generate digital signals which are transmitted over data send pair 104S of data channel 104 to station module 4. In station module 4, the data signals are applied to lead D21 and then forwarded through connection field 6 and intercom module 21 to register 13R in FIG. 3.

Let it be assumed that station 2 is on-hook and had not initiated a request for access to the intercom system. If the customer at station set 1 dials the number of some on-hook station, such as station set 2, the digital information received and decoded by register 13R, FIG. 3, causes register 13R to apply a low signal to the R– lead, such as lead R22, in link allotter 16 for the called station. The low signal appearing on lead R22 is applied to the right-most input of NAND gate 325. The signal appearing on lead R22 is also applied to circuitry (not shown) to cause ringing to to be applied to the ringer of station set 2.

With called station set 2 in the on-hook condition, intercom module 22 applies a high signal to lead $\overline{Y}$22. The high signal on lead $\overline{Y}$22 is applied to the left-hand input of NAND gate 325. At this time, inverter 327 applies a high signal to the center input of NAND gate 325. The right-most input of NAND gate 325 is kept in the low signal state by the low signal on lead R22. Since one of the inputs of NAND gate 325 is in the low signal state, the output of NAND gate 325 will be in the high signal condition. As is well known, a NAND gate is a device which will produce a low signal at its output only if all of its inputs are in the high signal state. The high signal state at the reset input of busy link flip-flop 324 maintains this flip-flop reset.

When, responsive to the ringing, the station user at station set 2 depresses the intercom button 2C and removes the handset from the switchhook cradle, a high signal will appear on lead A22 just as if station set 2 were requesting initial access to the talking link. The high signal on lead A22 is ineffective to set talking link flip-flop 322 for called station set 2 because of the low signal maintained on bus WO by the set state of the calling station's talking link flip-flop 321. However, the high signal on lead A22 is inverted by inverter 313 and is applied as a low signal to the left-hand input of NOR gate 314. The right-hand input of NOR gate 314 has a low signal applied by the WO bus. Accordingly, a high signal is applied to the set input of busy link flip-flop 324. However, the low signal on the R22 lead input of NAND gate 325 causes that gate to apply a high signal to the reset input of busy link flip-flop 324. Since busy link flip-flop 324 is comprised of cross-connected NOR gates, it responds to the high signal condition simultaneously applied to its set and reset inputs S and R by maintaining its output in the low signal condition. Accordingly, busy link flip-flop 324 remains reset. It will be observed that except for the presence of the ringing signal busy link flip-flop 324 would have been set when the customer at station set 2 requested access to the intercom link.

It will be recalled that the request for connection to the talking link is made by the particular intercom module presenting a high signal on the A– lead of link allotter 16. This high signal will normally be present only during the continuance of the B4 time slot pulse shown in FIG. 5. The first of the A– leads to be provided with such a high signal causes a low signal to appear on bus WO. Thereafter no other talking link flip-flop can be set. If any other station set requests access to the intercom link, its corresponding busy link flip-flop in link allotter 16 will be set connecting that station's tip-and-ring conductors to the busy link 19, FIG. 4. As previously mentioned the appearance of a high signal on an A– lead when there is a low signal on bus WO tends to produce a high signal at the set input of the busy link flip-flop corresponding to the station generating the high A– signal.

In the previous case, the busy link flip-flop discussed was the busy link flip-flop for the called station which tends to receive an active set input when the called station answers the call. In that case, the busy link flip-flop is not set because it receives a high active signal at its reset input due to the ringing control output of register 13R. However, it is also possible for the time slot signal applied to lead B4 of the calling station module to persist after the call of station station's talking link flip-flop in link allotter 16 has been set. Under these circumstances, the calling station station's module such as station module 21 as previously described will produce a high signal on its A– lead, i.e., lead A21 which not only sets talking link flip-flop 321 in the normal manner, but persists after the talking link flip-flop has caused a low signal to appear on bus WO. Under these circumstances, inverter 312 applies a low signal to the left-hand input of NOR gate 318 and the WO bus applies a low signal to the right-hand input of NOR gate 318 thereby generating an active high signal tending to set talking link flip-flop 334. It is not desired, of course, for the busy link flip-flop belonging to the calling station to be set. However, in accordance with a further aspect of my invention, I prevent the busy link flip-flop from being set by simultaneously providing a high active signal to its reset input. This signal is produced because inverter 326 which is connected to the center input of NAND gate 333 inverts the high signal output produced by talking link flip-flop 321 in the set condition and applies it as a low signal to the input of NAND gate 333. As previously mentioned, a NAND gate having any one of its inputs in the low signal condition maintains its output in the high signal state. Accordingly, NAND gate 333 provides a high signal to the reset input of busy link flip-flop 334 which accordingly maintains it output in the low signal state thereby preventing the calling station from inadvertently being connected to the busy link.

Once a communications connection has been established between a calling and called telephone as that previously described between telephone stations 1 and 2 and the calling station replaces his telephone receiver on the switchhook cradle, a high signal will be transmitted on lead $\overline{Y}$21 from intercom module 21 to link allotter 16. The high signal on lead $\overline{Y}$21 is applied to the reset input of MA flip-flop 321 resetting this flip-flop. Flip-flop 321 in the reset state removes the high signal from lead MA 21 and accordingly high signals are removed from the input of invertor 305 and from the lower input of OR gate 330. The inverter, accordingly, no longer applies a low signal to the WO bus while the former removes the drive which maintains transistor DR–1 in talking link 15. Turning off transistor DR–1 disconnects leads T–1 and R–1 from the talking link. Since talking link flip-flop 322 was not set when the called station answered the call, the resetting of the calling station's talking link flip-flop allows the WO bus to return to the high signal or idle state as soon as the calling station initiates disconnect. The return of the high signal state to WO bus activates one shot monopulser MP to apply a reset signal over lead MRS to register decoder 13R. Register decoder 13R is thereupon reset and removes its ringing control active signal from lead R–22. If the called station remains in the off-hook condition after the calling station has thus disconnected, the high signal on lead A22 applied through inverter 311 to the left-hand input of NOR gate 310 will set talking link flip-flop 322 in the same manner that MA flip-flop 321 was set when station 1 was the initial calling station. In this manner, the station user at station 2 may obtain access to register decoder 13R after calling station disconnects without replacing his handset on the switchhook cradle.

Conclusion

Accordingly, I have shown an allotter circuit which functions to grant exclusive register access to a first calling station, to connect that station to the talking link, to connect any subsequent service-requesting station to the busy link and which distinguishes called station answer from a service request to connect the called station to the talking link in communications relationship with the calling station.

Thus far, I have described one illustrative embodiment of my invention. It will be apparent that numerous modifications are possible. For example, my allotter circuit will also find useful application in helping provide conferencing service on the intercom link. This may be accomplished by merely adding a flip-flop, not shown, for each output lead R21–R22 of register decoder 13R to store the register output while the register is cleared to make it available to receive the identity of whatever third or further station is to be connected on to intercom talking link 15. To clear the register and set the aforementioned flip-flops for this purpose another of station set 1's key buttons, not specifically designated by reference numeral in the drawing, would be designated as a conferencing key. Operation of this key would be registered during a specific time slot in an additional flip-flop in intercom module 21 whose state would set the flip-flops at the output of the register decoder and then release the register so that it could be reused in the same manner as just described for an intercom call. Other modifications will be apparent to those of ordinary skill without departing from the spirit and scope of my invention.

What is claimed is:

1. A link allotter circuit for connecting any of a plurality of telephone stations to a talking link or a busy link comprising a talking link and a busy link, means responsive to a service request from one of said stations for connecting said station to said talking link, a control circuit respective to each of said stations, means including said control circuit responsive to a service request subsequently initiated by any other of said stations for connecting said other station to said busy link, and means for applying a ringing signal to the control circuit associated with a called one of said stations to prevent said called station from being effectively connected to said busy link.

2. A link allotter circuit according to claim 1 wherein said control circuit respective to each of said stations comprises a NOR gate flip-flop.

3. A link allotter circuit according to claim 2 wherein said means for connecting a station to said talking link comprises a NOR gate flip-flop respective to each station and means for setting said talking link connecting flip-flop during a predetermined time interval.

4. A link allotter circuit according to claim 3 further comprising bus means energizeable responsive to the setting of a first one of said talking link connecting flip-flops for normally inhibiting the setting of any other one of said talking link connecting flip-flops.

5. A link allotter circuit according to claim 4 wherein said control circuit includes means for detecting the energization of said bus means and means for detecting a service request from said other one of said stations.

6. A link allotter circuit according to claim 5 wherein said means for detecting the energization of said bus and said means for detecting said service request are each connected to apply a signal to set the NOR gate flip-flop of said control circuit respective to each said service requesting station.

7. A link allotter circuit according to claim 6 further comprising means for inhibiting the setting of said last-mentioned flip-flop respective to said called one of said stations, said inhibiting means including means for applying a reset signal to said last-mentioned flip-flop simultaneously with said signal to set said flip-flop.

8. A link allotter circuit for connecting any of a plurality of telephone stations to a talking link or to a busy link comprising a talking link and a busy link flip-flop respective to each station set, means responsive to a service request from one of said stations for setting a corresponding one of said talking link flip-flops, means responsive to the setting of said one of said talking link flip-flops for inhibiting the setting of the remainder of said talking link flip-flops, means responsive to a service-request signal subsequently initiated by any other one of said stations for applying a signal to set the one of said busy link flip-flops respective to said other of said stations, means for applying a ringing signal to the one of said busy link flip-flops respective to a called one of said stations, and means including said ringing signal applying means for inhibiting the effective setting of said last-mentioned busy link flip-flop when said called station initiates a service request.

9. A link allotter circuit according to claim 8 wherein said talking link and said busy link flip-flops each comprise a pair of cross-coupled NOR gates.

10. A link allotter circuit for use with a plurality of telephone stations whereby a service request signal from both a calling telephone station and a called telephone station may be used for connecting both said calling and said called stations to a talking link comprising talking link memory control means for each of said stations, busy memory control means for each of said stations, means responsive to a service request signal from the calling station for setting its talking link memory control means, means for normally setting the busy memory control means of each of the other of said stations upon receipt of a service request signal subsequent to the setting of said calling station talking link memory control means, and means for inhibiting the effective setting of another station's busy memory control means upon receipt of a service request signal from said another station and upon identification of said another station as a called station.

11. A link allotter circuit in accordance with claim 10 wherein said service request signals occur in discrete time intervals and further comprising means for preventing erroneous setting of a calling station's busy memory control means on persistence of the calling station's service request signal beyond its discrete time interval.

12. A link allotter circuit in accordance with claim 11 wherein said talking link memory control means and said busy memory control means each comprises NOR gates cross-connected to define flip-flops.

* * * * *